Oct. 13, 1953 L. D. COBB 2,655,393
DEMOUNTABLE SEAL
Filed April 28, 1950

INVENTOR;
LELAND D. COBB.
BY Romeyn A. Spare
HIS ATTORNEY

Patented Oct. 13, 1953

2,655,393

UNITED STATES PATENT OFFICE 2,655,393

DEMOUNTABLE SEAL

Leland D. Cobb, Forestville, Conn., assignor to General Motors Corporation, Detroit, Mich., a corporation of Delaware Application April 28, 1950, Serial No. 158,818

7 Claims. (Cl. 286—5)

This invention relates to demountable seals for closing an annular lubricant chamber between relatively rotatable members and particularly to a unit-handling seal that may be easily inserted between and removed from the race rings of an antifriction bearing without injury to the seal or to the bearing and which will retain lubricant within the bearing and exclude dirt from the bearing.

It is common practice to seal lubricant within an antifriction bearing for the life of the bearing by permanently installing, during bearing manufacture, a sealing assembly including an annular metal lip or rim bent over into tightly wedged engagement against the walls of a race ring groove. The life of such a bearing depends largely upon its lubrication. In bearing installations where abnormal bearing loads exist and/or where the bearing is subjected to high temperatures, the bearing lubricant breaks down, produces hard tar-like deposits which impede bearing operation and provides insufficient lubrication, all of which shortens the bearing life. The exhausted lubricant and hard tar-like deposits in these permanently sealed bearings cannot be cleaned out and replaced with fresh lubricant since these permanently installed seals prevent access to the lubricant chamber and are irreparably damaged upon removal, and frequently the removal of such a seal injures the bearing.

An object of this invention is to provide an improved and simply constructed demountable closure for maintaining lubricant within an antifriction bearing and which may be easily and repeatedly removed from and replaced within the bearing without injury to either the closure or to the bearing and while the bearing remains in an operative position.

Another object is to provide for the end of an annular lubricant chamber in an antifriction bearing an improved and easily demountable seal or closure which may be resiliently snapped as a unit into and out of operative position.

A further object is to provide an improved demountable unit-handling seal which may be easily and repeatedly mounted in and removed from sealing engagement with a pair of relatively rotatable members to close a lubricant chamber therebetween and which will maintain an effective sealing relation even under conditions of misalignment.

To these ends and also to improve generally upon devices of this character, this invention consists in the various matters hereinafter described and claimed. In its broader aspects, the invention is not necessarily limited to the specific structures selected for illustrative purposes in the accompanying drawings wherein Figure 1 is a cross sectional enlarged view of a portion of an antifriction bearing illustrating two related forms of my invention;

Figure 1:
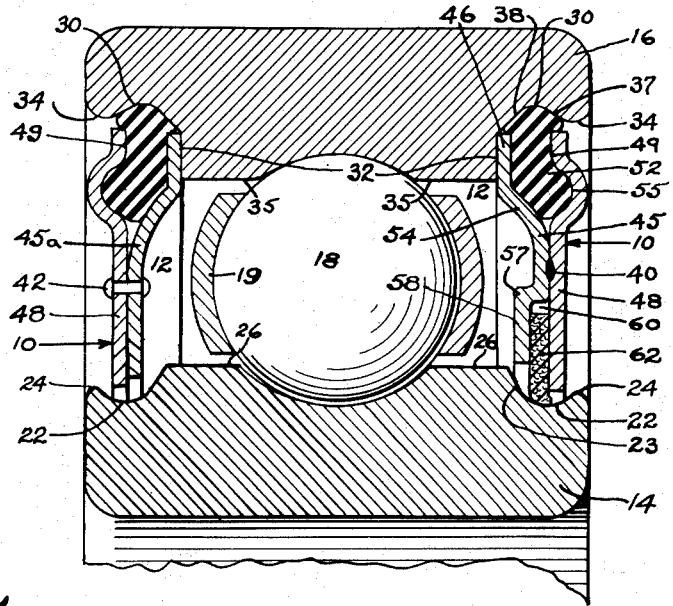

My seal, generally indicated at 10, provides an easily demountable unit-handling closure for the end of an annular lubricant chamber 12 between a pair of relatively rotatable members, as antifriction bearing inner and outer race rings 14 and 16 having the usual opposed raceways that receive rolling elements, as balls 18, guided by a cage 19. The antifriction bearing is shown symmetrical at each side of a plane through the ball centers. Each end of the inner race ring 14 has a peripheral groove 22 generally arcuate in cross section and extending between a sloping annular wall 23 that preferably forms a continuation of a side wall of the groove, and a narrow annular slinger portion 24 having a diameter intermediate between that of the bottom of the groove and that of the cylindrical periphery 26 of the inner race ring 14. Each end of the outer race ring 16 has an annular recess 30 extending between an annular shoulder 32 and a transversely rounded annular marginal land 34 having a diameter intermediate between the diameter of the bottom of this recess and that of the inner cylindrical wall 35 of this outer race ring. Each recess 30 has a sloping outer wall 37 and a sloping inner wall 38, these walls preferably merging with a rounded bottom of the recess. The inner wall 38 abuts the shoulder 32 along a circle having a diameter less than that of the annular land 34.

Figure 2:
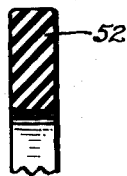
Figure 2 is a fragmentary view showing the resilient mounting ring before assembly with my seal structure.
Figure 4:
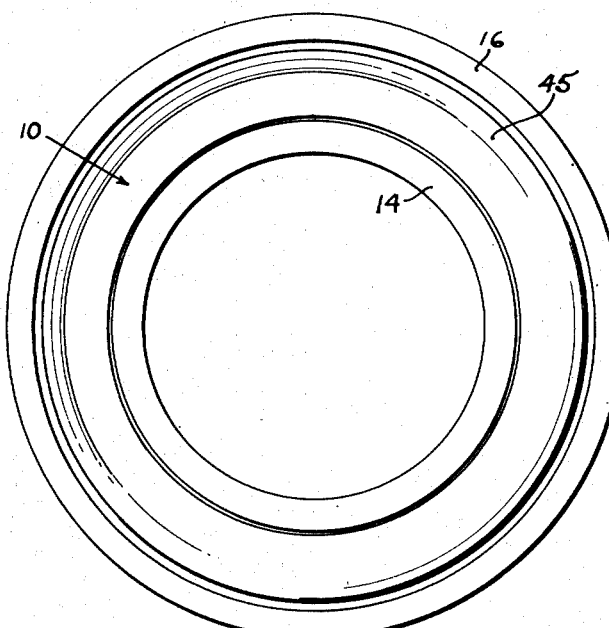
Figure 4 is an end elevation showing my seal mounted in an antifriction bearing.
Figure 3:
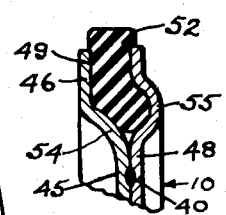
Figure 3 is a fragmentary view of my seal.

Each unit-handling seal 10 includes an annular inner shield and an annular outer shield which may be stamped out and bent to shape from suitable material, as sheet metal, the intermediate flat body portions of these shields being fastened together at several annularly spaced positions as by spot welding at 40 or by rivets 42. The inner shield, as 45, has an offset annular flat portion 46 engageable with the shoulder 32 and laterally spaced from the outer shield, as 48, to provide between these shield peripheries an annular groove 49 in which is clamped a resilient mounting ring 52 that may be deformably snapped into the recess 30 to demountably position the seal 10 across the end of the lubricant chamber 12. This inner shield has an outer diameter substantially the same as that at the juncture of the annular recess wall 38 and the shoulder 32 to aid in locating the mounted seal concentric with the bearing. The mounting ring 52 may be composed of various materials inherently resilient in all directions, herein referred to as an elastomer, and which will not deteriorate or appreciably change resiliency in the presence of lubricant, heat and light, one satisfactory elastomer being a resilient vulcanized synthetic rubber containing a polymerization product of butadiene and acrylic nitrile and sometimes referred to as Buna N rubber. Before assembly with the shields, the resilient uncompressed mounting ring 52 is preferably rectangular in cross section, as shown in Figure 2, and larger than the groove 49. When assembled with the shields, the resilient mounting ring will be laterally compressed between the shield peripheries and laterally deformed between an annularly extending convexed inner shield portion 54 and a laterally projecting annular pocket 55 formed by a bulge in the outer shield. When the unit-handling seal assembly is demounted from the bearing, the resilient mounting ring 52 radially projects beyond the shield peripheries as shown in Figure 3 and has an outer diameter intermediate between that of the annular land 34 and that of the bottom of the outer race ring recess 30. The mounting ring 52 may be located between the shields during assembly of the shields, or, if preferred, due to its freely resilient character, it may be deformably wedged into seating engagement in the groove 49 after the shields have been permanently fastened together.

In the right hand shield of Figure 1, the inner shield has an annular stepped portion 57 provided with an annular wall 58 spaced from and generally parallel to the adjacent outer shield wall to provide between these shields an annular channel 60 radially opening inwardly into the groove 22. A yieldable sealing washer 62, which may be composed of a suitable sealing material as a tightly woven resilient felt that is substantially impervious to lubricant, projects radially inwardly beyond the shields into lightly wiping sealing engagement with a wall of the groove 22. This sealing washer 62, which has substantially parallel side faces slidably and sealingly engaging the side walls of the channel 60, has an outer diameter less than the diameter at the bottom of the channel so that in the event of misalignment the sealing washer will remain concentric with the inner race ring 14 and radially adjust itself within the channel while maintaining an effective sealing relation. The outer shield 48 has a central bore diameter slightly exceeding that of the slinger portion 24 to admit the sealing washer past this slinger portion during mounting and demounting of the seal, and the central bore through the inner shield 45 slightly exceeds that of the outer shield to allow for flexible sealing washer engagement against the sealing groove wall.

The left hand seal of Figure 1 generally corresponds with the right hand seal of this figure except that the inner shield 45a and the outer shield 48 radially extend across the lubricant chamber 12 into the groove 22 in closely surrounding spaced relation to the inner race ring 14 and no sealing washer is employed.

In assembly, the unit-handling seal is positioned across the end of the lubricant chamber 12 with the peripheral portion of the resilient mounting ring 52 laterally engaging the transversely rounded land 34 which is of lesser diameter than this mounting ring. Succeeding portions of the seal are progressively pressed towards the bearing causing the outer portion of the mounting ring to laterally deform away from the bearing and to subsequently snap past the land 34 in the recess 30 as the annular flat shield portion 46 comes into engagement with the shoulder 32. Before assembly, the peripheral portion of the mounting ring 52 which radially projects beyond the shields has a volume exceeding that of the annularly extending recess 30 and is compressed radially outwardly to a small extent due to its clamped engagement within the groove 49. When installed, the mounting ring substantially fills the recess 30 and is deformed into sealing engagement with the recess walls and engages the wall 37 under sufficient resilient compression to hold the annular inner shield firmly seated against the shoulder 32 as well as to tightly secure the seal in unit-handling relation with the bearing. My unit-handling seal 10 may be easily removed by prying with a screw driver or other suitable tool between the land 34 and the outer shield periphery. The resilient deformability of the mounting ring 52 provides a demountable seal structure which may be repeatedly and easily mounted in and demounted from sealing position without injury to the seal or to the bearing in which it is mounted.

I claim:

1. In a closure for demountable positioning across an annular lubricant chamber between a pair of relatively rotatable members, one of said members having an annular recess opening towards the other member, a pair of cooperating annular shields extending alongside the lubricant chamber, means fastening together intermediate body portions of said shields, laterally spaced apart annular portions on said shields providing between the shields an annular groove opening into said annular recess, a mounting ring of compressible resilient material deformably compressed within and substantially filling said groove and having a peripheral portion radially extending beyond said shields, one of said annular shield portions laterally seating against the annularly recessed member adjacent said recess, and said peripheral ring portion being demountably received in relatively non-rotatable compressed seated sealing engagement within said annular recess.

2. In a unit-handling closure for demountable positioning across an annular lubricant chamber between a pair of relatively rotatable members one of which has an annular recess radially opening towards the other member, an annular shoulder extending generally radially from said annular recess, a pair of cooperating annular shields extending alongside the lubricant chamber and having intermediate flat body portions secured together, laterally spaced apart peripheral shield portions providing between the shields an annular groove of non-rectangular cross section opening towards said recess, an elastomeric ring of initially rectangular cross section deformably clamped between the shields and substantially filling said groove and radially projecting from the groove into resiliently compressed non-rotatable sealing relation with the walls of the annular recess, the resiliently compressed elastomeric ring urging one of the peripheral shield portions into seated engagement with said annular shoulder, and said ring being of such resilient deformability that the closure may be resiliently snapped as a unit into and out of said recess.

3. In a unit-handling closure for demountable positioning across an annular lubricant chamber between a pair of relatively rotatable members, one of said members having an annular recess radially opening towards the other member, said other member having an annular seal-receiving groove radially opening towards the annular recess, a pair of adjacent annular shields extending across the lubricant chamber and cooperatively providing an annular channel opening towards the seal-receiving groove, a yieldable sealing washer in the channel and sealingly engaging a wall of said groove, a laterally offset annular portion on one of the shields providing between the shields an annular groove radially opening towards said recess, and a ring of elastomeric material deformably clamped by the shields in said last-mentioned groove and radially extending beyond the shields into demountably seated compressed sealing engagement with a wall of said annular recess.

4. In a unit-handling seal for demountable positioning across an annular lubricant chamber between a pair of relatively rotatable members one of which has an annular recess radially opening towards the other member, said other member having an annular seal-receiving groove radially opening towards said recess, a pair of annular shields extending across the lubricant chamber and providing therebetween an annular channel radially opening towards the seal-receiving groove, a yieldable sealing washer of lubricant impervious material radially movable against the sides of said channel and extending into sealingly wiping engagement with a wall of the seal-receiving groove, means fastening intermediate body portions of the shields together, spaced peripheral shield portions providing an annular groove opening radially towards said recess, an elastomeric mounting ring deformably gripped by the shields in said last-mentioned groove and radially extending beyond the shields into resiliently compressed demountably seated engagement with a wall of said annular recess, and said elastomeric ring having such inherent resiliency that it may be laterally deformed into and out of seated engagement in said recess.

5. In a unit-handling seal for demountable positioning across an annular lubricant chamber between a pair of relatively rotatable members, one of said members having an annular recess opening towards the other member, a flat annular shoulder and a marginal land on said annularly recessed member and respectively located at opposite sides of said recess, a pair of adjacent annular shields extending alongside the lubricant chamber, means securing intermediate body portions of the shields together, a laterally offset flat annular portion on one shield engageable with said shoulder and spaced from the other shield to provide between these shields an annular groove opening towards the recess, a mounting ring of elastomeric material deformably gripped by the shields in said groove and radially and laterally projecting beyond the shields into compressibly seated relatively non-rotatable engagement against the walls of the recess and holding the seal in position with the flat annular shield portion seated against said annular shoulder, and the radially projecting portion of the mounting ring being of such a size that it may be deformably snapped past the annular land to demountably position the seal in compressibly seated engagement in said annular recess.

6. In a unit-handling seal for demountable positioning across an annular lubricant chamber between a pair of relatively rotatable members, one of said members having an annular recess opening towards the other member and laterally extending between a flat annular shoulder and a marginal annular land, adjacent inner and outer shields extending across the lubricant chamber and having intermediate flat body portions secured together, a laterally offset flat annular wall on the inner shield engageable with the shoulder, the periphery of said offset wall engaging and being centered by a wall of said recess, the shield peripheries being laterally spaced apart to provide an annular groove radially opening towards said recess, one of the side walls of said groove being laterally offset radially inwardly of the groove and providing an inner groove portion of greater width than that between the shield peripheries, a ring of elastomeric material deformably gripped by the shields in said groove and having a peripheral portion radially extending beyond the shields into compressed seated relatively non-rotatable engagement against the walls of said recess and holding the seal in operative position with the laterally offset wall seated against said annular shoulder, and said ring being of such resiliency that it may be deformably snapped past the marginal land into and out of seated non-rotatable sealing relation in said recess.

7. In a unit-handling seal for demountable positioning across an annular lubricant chamber between a pair of relatively rotatable members one of which has an annular recess radially opening towards the other member, a pair of cooperating annular shields extending alongside the lubricant chamber and having intermediate flat body portions secured together, laterally spaced annular peripheral portions on the shields and providing between the shields an annular groove, one of said portions having an annular wall laterally offset from the shield body, the other annular portion being laterally offset adjacent to the bottom of said groove and providing at the bottom of the groove a laterally projecting annular pocket, a mounting ring of elastomeric material deformably compressed by the shields from an initially rectangular cross section and substantially filling said groove and pocket and radially projecting from said groove, and the radially projecting portion of the mounting ring being resiliently compressed into non-rotatable demountably seated engagement with the walls of said annular recess.

LELAND D. COBB.

References Cited in the file of this patent

UNITED STATES PATENTS

| Number | Name | Date |
|---|---|---|
| Re. 21,584 | Brodin | Oct. 1, 1940 |
| 2,320,794 | Pew | June 1, 1943 |
| 2,347,953 | Katcher | May 2, 1944 |
| 2,352,784 | Geyer | July 4, 1944 |
| 2,467,049 | Peterson | Apr. 12, 1949 |
| 2,530,052 | Firth | Nov. 14, 1950 |